(12) United States Patent
Shingaki et al.

(10) Patent No.: US 8,177,920 B2
(45) Date of Patent: May 15, 2012

(54) GRAIN-ORIENTED ELECTRICAL STEEL SHEET AND PROCESS FOR PRODUCING THE SAME

(75) Inventors: Yukihiro Shingaki, Kurashiki (JP); Minoru Takashima, Kurashiki (JP); Tadashi Nakanishi, Kurashiki (JP); Takeshi Murai, Kurashiki (JP)

(73) Assignee: JFE Steel Corporation, Tokyo (JP)

( * ) Notice: Subject to any disclaimer, the term of this patent is extended or adjusted under 35 U.S.C. 154(b) by 984 days.

(21) Appl. No.: 11/663,751

(22) PCT Filed: Nov. 28, 2005

(86) PCT No.: PCT/JP2005/022232
§ 371 (c)(1),
(2), (4) Date: Mar. 4, 2008

(87) PCT Pub. No.: WO2006/059740
PCT Pub. Date: Jun. 8, 2006

(65) Prior Publication Data
US 2009/0101248 A1    Apr. 23, 2009

(30) Foreign Application Priority Data
Nov. 30, 2004   (JP) .................................. 2004-345604

(51) Int. Cl.
*C21D 8/12* (2006.01)
*C22C 38/02* (2006.01)
*H01F 1/16* (2006.01)
*H01F 27/245* (2006.01)

(52) U.S. Cl. .................... 148/113; 148/308; 420/117

(58) Field of Classification Search .................. 148/110, 148/111, 112, 113, 308; 336/218; 420/117, 420/118
See application file for complete search history.

(56) References Cited

U.S. PATENT DOCUMENTS

| | | | |
|---|---|---|---|
| 1,965,559 A | 7/1934 | Gross | |
| 3,856,568 A | 12/1974 | Tanaka et al. | |
| 3,932,234 A | 1/1976 | Imanaka et al. | |
| 3,985,583 A | 10/1976 | Shimanaka et al. | |
| 6,309,473 B1 * | 10/2001 | Hayakawa et al. | 148/111 |

(Continued)

FOREIGN PATENT DOCUMENTS

EP    1 004 680 A1    5/2000

(Continued)

OTHER PUBLICATIONS

Office Action (Reason for Rejection) dated Jan. 4, 2011 for JP 2004-345604.

(Continued)

*Primary Examiner* — George Wyszomierski
*Assistant Examiner* — Mark L Shevin
(74) *Attorney, Agent, or Firm* — Holtz, Holtz, Goodman & Chick, P.C.

(57) ABSTRACT

The present invention provides a grain-oriented electrical steel sheet produced by a method for promoting secondary recrystallization without an inhibitor, the grain-oriented electrical steel sheet including 2.0% or more and 4.5% or less of Si and 0.01% or more and 0.5% or less of Mn on a mass % basis, wherein the number of oxide particles having a diameter of 1 to 3 μm among that (oxide particles) of containing Ca and/or Mg is 400 or less per unit area (1 $cm^2$) in a transverse cross-section perpendicular to a rolling direction. Therefore, the grain-oriented electrical steel sheet has excellent stable magnetic properties throughout the length of a coil.

13 Claims, 3 Drawing Sheets

U.S. PATENT DOCUMENTS 6,811,619 B2 * 11/2004 Hayakawa et al. ............ 148/111
7,465,361 B2 * 12/2008 Terashima et al. ............ 148/111

FOREIGN PATENT DOCUMENTS

| EP | 1 279 747 A2 | | 1/2003 |
| EP | 1279747 A2 | * | 1/2003 |
| GB | 2 038 367 A | | 7/1980 |
| JP | 40-15644 | | 7/1965 |
| JP | 48-39338 A | | 6/1973 |
| JP | 50-79442 A | | 6/1975 |
| JP | 51-13469 | | 4/1976 |
| JP | 62-267447 A | | 11/1987 |
| JP | 05-279760 A | | 10/1993 |
| JP | 06-128618 A | | 5/1994 |
| JP | 06-158240 A | | 6/1994 |
| JP | 08-199239 A | | 8/1996 |
| JP | 9-157747 A | | 6/1997 |
| JP | 11-012702 A | | 1/1999 |
| JP | 2000-129356 A | | 5/2000 |
| JP | 2002-097513 A | | 4/2002 |
| JP | 2003-049250 A | | 2/2003 |
| JP | 2003-201518 A | | 7/2003 |
| JP | 2004-076146 A | | 3/2004 |
| JP | 2004-238734 A | | 8/2004 |

OTHER PUBLICATIONS

A. Sakakura et al., "Recent Developments in Magnetic Properties of Grani-Oriented Silicon Steel With High Permeability", *Conf. Proc. M.M.M.*, pp. 714-715 (1974).

Supplementary European Search Report dated Feb. 25, 2011 for Application No. EP 05 81 1523.

* cited by examiner (a)

(b)

EXAMPLE OF OXIDE NOT CONTAINING Ca OR Mg ($Al_2O_3$)

EXAMPLE OF OXIDE CONTAINING Ca AND/OR Mg (Al·Si·Fe OXIDE + TiN·CuS COMPLEX PRECIPITATION)

GRAIN-ORIENTED ELECTRICAL STEEL SHEET AND PROCESS FOR PRODUCING THE SAME

This application is the United States national phase application of International Application PCT/JP2005/022232 filed Nov. 28, 2005.

TECHNICAL FIELD

The present invention relates to a grain-oriented electrical steel sheet having stable magnetic properties and a process for producing the same.

BACKGROUND ART

Grain-oriented electrical steel sheets are mainly used for iron cores in transformers or the like. In recent years, as demands for energy-saving iron cores have been increasing, the grain-oriented electrical steel sheets constituting the iron cores are required to have more excellent magnetic properties, i.e., low iron loss and high magnetic flux density.

A grain-oriented electrical steel sheet has a crystalline structure in which the <001> direction, which is the axis of easy magnetization of iron, is in excellent accord with the direction of rolling of the steel sheet. Such a texture is formed by secondary recrystallization, in which crystal grains with the {110} <001> direction, i.e., the Goss orientation, are preferentially grown into giant grains, during a finishing annealing (finish annealing) step in the process for producing the grain-oriented electrical steel sheet. Thus, the crystal orientation of the secondary recrystallized grains significantly affects magnetic properties of the grain-oriented electrical steel sheet.

Such a grain-oriented electrical steel sheet is produced by a known method described below. A steel slab containing about 4.5 percent by mass or less of Si and an element that forms an inhibitor, such as MnS, MnSe, AlN, or BN, is heated at 1,300° C. or higher, subjected to hot rolling, and, if necessary, subjected to hot rolled steel annealing (normalizing). The term "inhibitor" means fine precipitates that suppress an increase in the size of recrystallized grains resulting from primary recrystallization in order to achieve appropriate secondary recrystallization. In a step of performing secondary recrystallization, for example, the precipitates coarsen to weaken the pinning effect, resulting in the occurrence of the secondary recrystallization. Then, after hot rolling or hot rolled steel annealing, cold rolling is performed once, or twice or more times including intermediate annealing, to form a sheet having a final thickness. The resulting sheet is subjected to primary recrystallization annealing in a wet hydrogen atmosphere to perform primary recrystallization and decarburization. An annealing separator mainly composed of magnesia is applied to the sheet. To perform secondary recrystallization and purify the inhibitor-forming element, the sheet is subjected to finishing annealing at 1,200° C. for about 5 hours (for example, see U.S. Pat. No. 1,965,559, Japanese Examined Patent Application Publication Nos. 40-15644 and 51-13469).

However, such a method for producing the grain-oriented electrical steel sheet must includes heating the slab at a high temperature and performing finishing annealing at a high temperature and a long period of time, resulting in significantly high production costs.

In order to overcome the problems, the patent applicant corporation developed a method for promoting secondary recrystallization without an inhibitor (for example, Japanese Unexamined Patent Application Publication No. 2000-129356).

The method totally differs in technical idea from the known method for producing a grain-oriented electrical steel sheet. In the known method, secondary recrystallization occurs with a precipitate (inhibitor), such as MnS, MnSe, or AlN. In contrast, in the method for promoting secondary recrystallization without an inhibitor, the inhibitor is not used. A reduction in resistance to grain boundary migration due to purification actualize an intrinsic difference in the rate of grain boundary migration depending on the structure of high-energy boundaries (texture inhibition effect), thereby promoting secondary recrystallization. The method for promoting secondary recrystallization without an inhibitor does not require heating the slab at a high temperature or performing finishing annealing at a high temperature and a long period of time. That is, costs for purification of the inhibitor are not required; hence, it has been possible to produce the grain-oriented electrical steel sheet at low costs.

DISCLOSURE OF INVENTION

Problems to be Solved by the Invention

However, in the course of the development of the method for promoting secondary recrystallization without an inhibitor, it was found that magnetic properties of a grain-oriented electrical steel sheet containing no inhibitor-forming element in a slab were disadvantageously sensitive to changes in production conditions. For example, a phenomenon in which even changes in conditions in a single coil caused relatively large changes in magnetic properties such as iron loss emerged as unsolved problems.

The present invention advantageously overcomes the problems. It is an object of the present invention is to provide a grain-oriented electrical steel sheet having stable excellent magnetic properties throughout the length of a coil and a process for producing the grain-oriented electrical steel sheet.

Means for Solving the Problems

The inventors have conducted intensive studies to elucidate the cause why uniform magnetic properties throughout the length of a coil are difficult to be achieved in the method for promoting secondary recrystallization without an inhibitor.

The inventors found that in a grain-oriented electrical steel sheet having nonuniformity in magnetic properties in a coil, a nonuniform primary recrystallization microstructure was observed in the coil and affected secondary recrystallization behavior. Since the method for promoting secondary recrystallization without an inhibitor is a technique promoting secondary recrystallization by intrinsic difference in the rate of grain boundary migration due to the structure of high-energy boundaries, it is desirable that a microstructure before secondary recrystallization is uniform, i.e., the grains after primary recrystallization have a uniform grain size.

It was speculated that a nonuniform precipitation state of impurities related to the cause of the nonuniformity of the microstructure after primary recrystallization. That is, in an inhibitor-free component system, a strong inhibitor, such as MnS, MnSe, or AlN, is not used. Furthermore, purification reduces a precipitate and an element that preclude grain boundary migration during secondary recrystallization. However, it is believed that this relatively enhances the effect of trace amounts of precipitates, which are precipitated in hot rolling or the like and usually have no effect of acting as inhibitors, due to inevitable impurities in steel on primary recrystallization. The amount of the precipitates due to the impurities is small, thus being liable to cause nonuniform distribution. As a result, it is believed that the grain sizes after primary recrystallization differs between front and back surfaces and in the longitudinal direction (direction of rolling) to form a nonuniform primary recrystallization microstructure in a coil.

To overcome the problems, it may be important that even when trace amounts of precipitates are present, the precipitates are uniformly dispersed in a coil.

The inventors speculated as follows: the presence of substances, such as steelmaking inclusions, functioning as nucleus for precipitation result in preferential precipitation around the substances to form regions deficient in the impurities around the inclusions, causing nonuniformity in the dispersion of the precipitations. Relationships between the inclusions and precipitation and between the inclusions and changes in properties in a coil were studied.

The results demonstrated that:

(a) Complex precipitates of trace amounts of the impurities include an oxide containing either Ca or Mg or both as a nucleus;

(b) An oxide not containing Ca or Mg hardly functions as a nucleus for precipitation; and (c) A coil composed of a material having a high content of an oxide containing either Ca or Mg or both is difficult to have stable magnetic properties.

The present invention is based on the findings described above.

The gist of configuration of the present invention will be described below.

(1) A grain-oriented electrical steel sheet having excellent magnetic properties and produced by a method for promoting secondary recrystallization without an inhibitor, the grain-oriented electrical steel sheet includes:

2.0% or more and 4.5% or less of Si and 0.01% or more and 0.5% or less of Mn on a mass % basis, wherein the number of oxide particles having a diameter of 1 to 3 μm among that (oxide particles) of containing Ca and/or Mg is 400 or less per unit area (1 cm$^2$) in a transverse cross-section perpendicular to a rolling direction.

With respect to the composition of the steel sheet, the remainder is preferably composed of Fe and inevitable impurities.

(2) A grain-oriented electrical steel sheet having a forsterite film includes 2.0% or more and 4.5% or less of Si and 0.01% or more and 0.5% or less of Mn on a mass % basis, wherein the contents of the steel sheet including the forsterite film are suppressed as follows; 50 ppm or less Al, 30 ppm or less Se, 50 ppm or less N, and 2 ppm or less B, Al, Se, N, and B being impurities, and O content in base steel is suppressed to 20 ppm or less, and the number of oxide particles having a diameter of 1 to 3 μm among that (oxide particles) of containing Ca and/or Mg is 400 or less per unit area (1 cm$^2$) in a transverse cross-section perpendicular to a rolling direction.

(3) In the grain-oriented electrical steel sheet having excellent magnetic properties described in item (1) or (2), the number of the oxide particles having a diameter of 1 to 3 μm among that (oxide particles) of containing Ca and/or Mg is 150 or less per unit area (1 cm$^2$) in the transverse cross-section perpendicular to the rolling direction.

(4) The grain-oriented electrical steel sheet having excellent magnetic properties described in any one of items (1) to (3) further contains one or two or more of:

0.005% to 1.50% Ni, 0.01% to 0.50% Sn,
0.005% to 0.50% Sb, 0.01% to 0.50% Cu,
0.01% to 0.50% Mo, 0.0050% to 0.50% P, and
0.01% to 1.50% Cr on a mass % basis.

(5) A process for producing a grain-oriented electrical steel sheet having excellent magnetic properties includes hot-rolling a steel slab to form a hot-rolled steel sheet, the steel slab containing 2.0% or more and 4.5% or less of Si, 0.01% or more and 0.5% or less of Mn; and suppressed elements of less than 100 ppm Al, 50 ppm or less S, 50 ppm or less Se, 50 ppm or less 0, and 50 ppm or less N, and the steel slab preferably further containing less than 5 ppm B, on a mass % basis; cold-rolling the hot-rolled steel sheet to form a cold-rolled steel sheet; and subjecting the cold-rolled steel sheet to primary recrystallization annealing and secondary recrystallization annealing, wherein the number of oxide particles having a diameter of 1 to 3 μm among that (oxide particles) of containing Ca and/or Mg in the hot-rolled steel sheet is controlled to 400 or less per unit area (1 cm$^2$) in a transverse cross-section perpendicular to a rolling direction.

Also in item (5), the number of the oxide particles having a diameter of 1 to 3 μm among that (oxide particles) of containing Ca and/or Mg in the hot-rolled steel sheet is preferably 150 or less per unit area (1 cm$^2$) in the transverse cross-section perpendicular to the rolling direction.

BRIEF DESCRIPTION OF THE DRAWINGS

FIG. 3 is a schematic graphic indicating transverse cross-section perpendicular to a rolling direction of a steel sheet or the like.

BEST MODE FOR CARRYING OUT THE INVENTION

The present invention will be described in detail below.

Inclusion

In the present invention, Ca and Mg are useful as adjusting agents for slag in a refining step. At least one of Ca and Mg is contained as a main component of slag. Inclusions that cause actual damage are probably formed by mixing (entrainment) of slag into molten steel, formation of deoxidization products containing slag as nuclei, and formation of the complex products with mixed (entrained) slag.

Thus, the precipitation of the inclusions was studied.

The results demonstrated that:

(1) Among oxides, functioning as main components of slag, each containing Ca or Mg or both (hereinafter, referred to as "oxides each containing Ca and/or Mg"), in the case where the number of the oxide particles each having a diameter of 1 to 3 μm exceeds 400 per unit area (1 cm$^2$) in a transverse cross-section to a rolling direction, the complex precipitation of impurities occurs on the oxide particles through a hot-rolling step and the subsequent annealing steps;

(2) Precipitates of the impurities in the base steel are partially deficient at the peripheries and the like of the oxide particles, resulting in nonuniform distribution; and (3) As a result, a primary recrystallization microstructure before finishing annealing is nonuniform in a coil and affects the uniformity of a secondary recrystallization texture to make it difficult to stably achieve appropriate magnetic properties throughout the length of the coil.

Thus, a method for effectively reducing the oxides containing Ca and/or Mg described above was studied.

The results demonstrated that an increase in the content of oxides due to slag mixing could be prevented by having enough time to float the mixed slag and by inhibiting the reoxidation from the slag.

For example, providing a waiting time (time from the completion of refining to the beginning of continuous casting) of 30 minutes or more before casting could effectively reduce the problematic inclusions. Furthermore, 0.8 or more of slag basicity (defined here as $CaO/SiO_2$, mass ratio) that is obtained by addition of CaO to slag, and T/D (tundish) flux having higher basicity (1.0 or more) could suppress the increase of amounts of the inclusions due to reoxidation.

With respect to the oxides each containing Ca and/or Mg, the diameter of the oxide particles, of which the number is limited to 400 or less per unit area (1 $cm^2$) in the transverse cross-section to the rolling direction, is 1 to 3 μm. The reason for the diameter range is described below.

Figure 1:
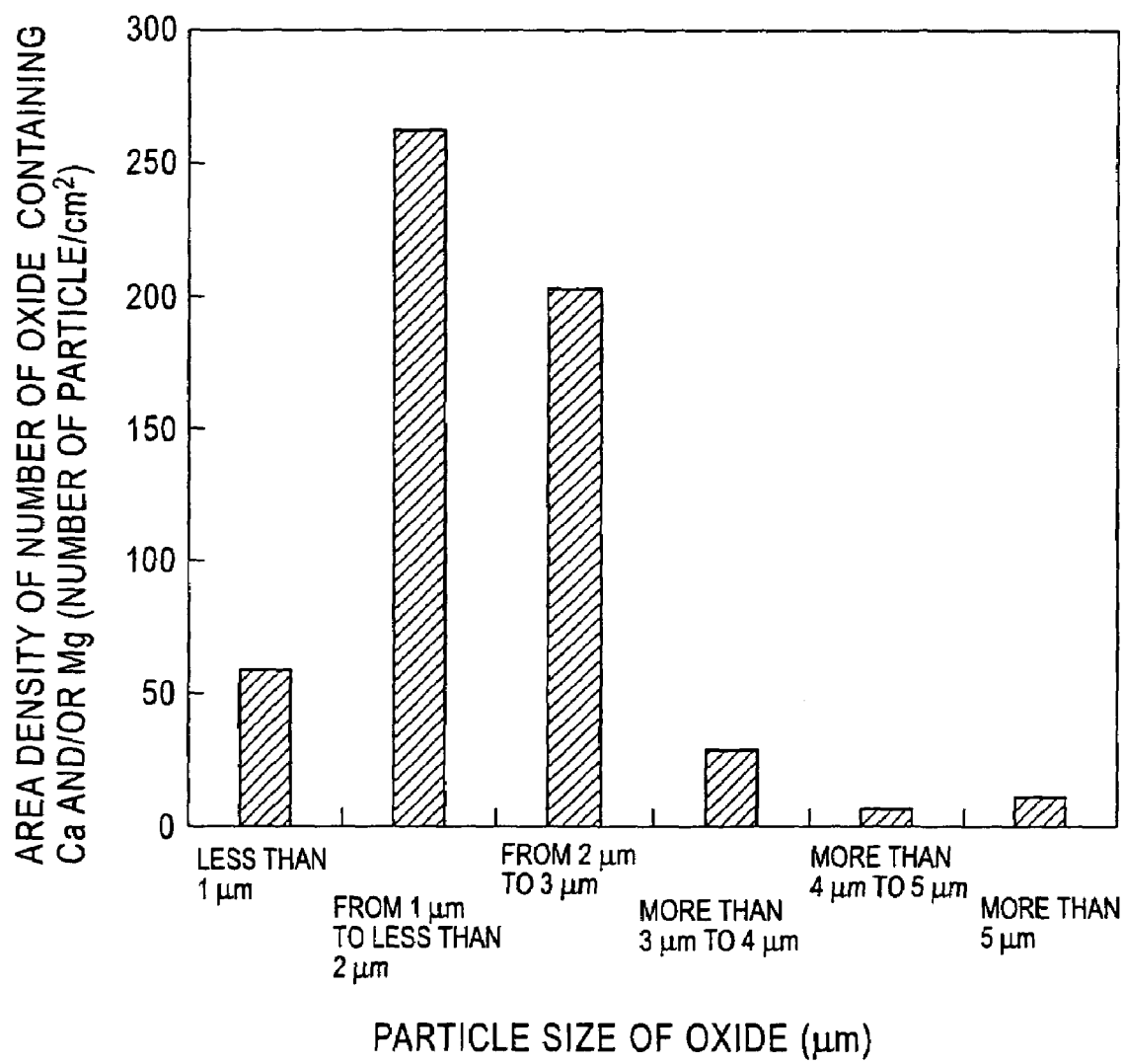
FIG. 1 is a graph showing an example of the particle-size-classified area-density distribution of oxide particles each containing Ca and/or Mg.
Figure 3:
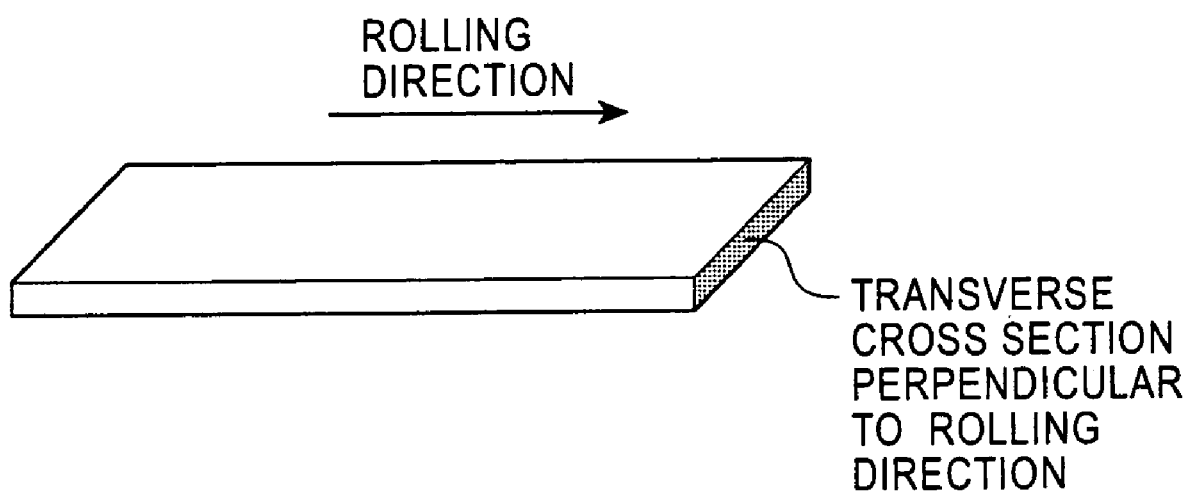

FIG. 1 shows results from research on oxides each containing Ca and/or Mg in a transverse cross-section to a rolling direction of a hot-rolled sheet for grain-oriented electrical steel sheet containing 0.03% C, 3.3% Si, 0.05% Mn, 40 ppm sol. Al, 20 ppm N, and 15 ppm S on a mass basis and not containing other inhibitor-forming element. The axis of abscissas indicates the oxides classified according to the particle size. The axis of ordinates indicates the area density (the number of particles/$cm^2$) of the classified oxides. The transverse cross-section perpendicular to the rolling direction is a section crossing the rolling direction (indicated by the arrow), as shown in FIG. 3 schematically showing a shaded portion. With respect to the particle sizes (diameters) of the oxides, the oxides were observed with a scanning electron microscope (SEM). In the oxide particles each being a spherical or having an aspect ratio of 2 or less, the diagonal length of the cross section of each particle is defined as a particle size. In the oxide particles each having an aspect ratio exceeding 2, the long side of the section is defined as a particle size.

With respect to the number of the oxide particles, 10 hot-rolled sheets based on different taps were prepared. The oxides present in a filed of view including the entire thickness in the through-thickness direction of each sheet were measured, the field of view being 1 $cm^2$. The number of the oxide particles each having a particle size of 0.1 μm or more was counted. The oxides were identified with an energy dispersive X-ray analyzer (EDX).

As shown in FIG. 1, the number of the oxide particles having a particle size of less than 1 μm or exceeding 3 μm is significantly small compared with the number of the oxide particles each having 1 to 3 μm. That is, the ratio of the number of the oxide particles having a particle size of less than 1 μm or exceeding 3 μm to the number of the oxide particles each having 1 to 3 μm is about ⅓ or less. Thus, the oxide particles having a particle size of less than 1 μm or exceeding 3 μm does not need to be controlled in a usual production process. In other words, the control of the oxide particles each having a particle size of 1 to 3 μm is sufficient to control an influence due to the oxide particles each containing Ca and/or Mg.

The distribution of the oxide particles is not particularly changed in the transverse direction except for end portions. This is the same as in cold-rolled steel sheets.

Inclusions other than the oxide particles each containing Ca and/or Mg and each having a particle size of 1 to 3 μm have substantially no effect on the nonuniformity in magnetic properties to be solved by the invention. Thus, the limitation of the inclusions is not particularly required as long as magnetic properties suitable for the intended use are achieved. To ensure iron loss commensurate with a Si content, the total number of the inclusions each having a particle size of 1 μm or more is preferably 2,000 or less and more preferably 1,000 or less per $cm^2$.

Results of an experiment for studying the effect of the inclusions of the oxides each containing Ca and/or Mg will be described below.

Experiment

With respect to a molten steel containing 0.02% C, 3.0% Si, 0.2% Mn, 5 ppm sol. Al, 30 ppm N, and 10 ppm S (on a mass basis) and having other inhibitor component contents at the same limited level of those of impurities, various waiting times before casting were conducted in order to float inclusions and change cleanliness, and then casting was performed. The resulting slabs were heated and then hot-rolled.

An end of each of the resulting hot-rolled sheets was cut. The cross sections thereof were observed with SEM equipped with EDX.

Figure 2:
FIG. 2 shows an oxide (a) not containing Ca or Mg; and an oxide (b) containing Ca and Mg, among oxides included in steel.
Figure 2:
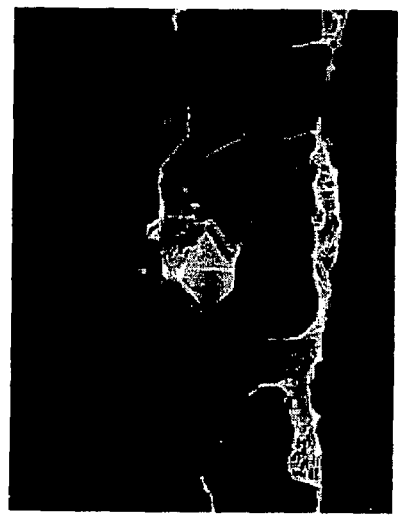
Figure 2:
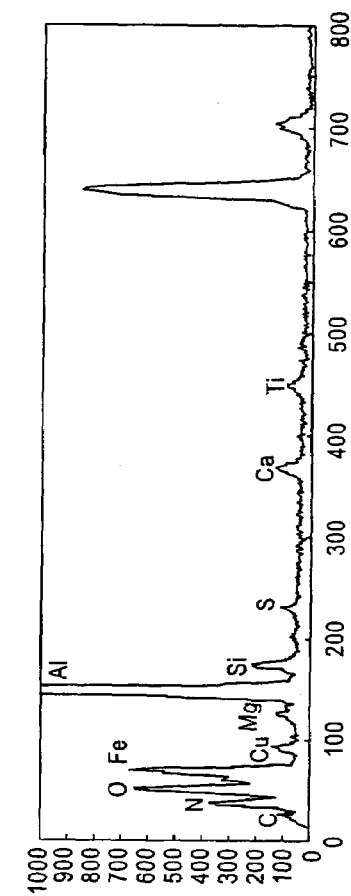
Figure 2:
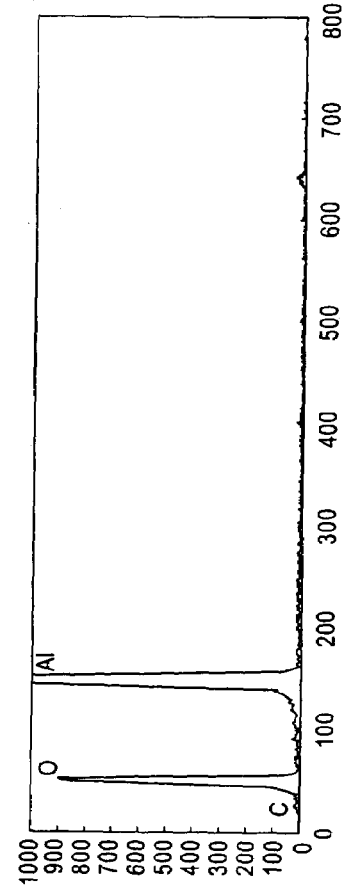

The results demonstrated that an oxide (a) (mainly composed of $Al_2O_3$) not containing Ca or Mg and an oxide (b) containing Ca, Mg were observed in steel, as exemplified in FIGS. 2(a) and (b). Furthermore, it was found that other oxides (Al.Si.Fe oxides), a nitride (TiN), sulfides (CuS and MnS), and the like were complexly and preferentially precipitated onto the oxide particle containing Ca, Mg (small amounts of Cu, Ti, and the like are present as impurities without intentional addition). Precipitated inevitable impurities were mainly sulfides, followed by O and N.

On the other hand, in the oxide not containing Ca or Mg (for example, $Al_2O_3$-based inclusions and SiO-based inclusions, and the like), the complex precipitation of impurities was not often observed.

After hot rolled steel annealing, cold rolling was performed once to form a final cold-rolled sheet, followed by primary recrystallization annealing. In a material having sufficiently reduced contents of oxide particles each containing Ca or Mg in a steelmaking, i.e., in the material in which the number of oxide particles each containing Ca and/or Mg and each having a diameter of 1 to 3 μm in a transverse cross-section perpendicular to the rolling direction is 400 or less per unit area (1 $cm^2$), a significantly uniform primary recrystallization microstructure was obtained after primary recrystallization annealing. That is, a variation in average crystal grain size per $cm^2$ in a cross-section along the rolling direction was in the range of ±0.3 μm, the cross-section passing through any of positions located in front and back surfaces, in the rolling direction of the coil, and in the transverse direction in the same coil.

An annealing separator was applied onto surfaces of the steel sheets. After subsequent finishing annealing, a coating solution (including a embrocation containing dispersoid, for example, a colloidal solution and the like) containing a phosphate, a chromic acid, and colloidal silica described in Japanese Unexamined Patent Application Publication Nos. 50-79442 and 48-39338 was applied to the steel sheets and baked at about 800° C. to form insulating films.

A variation ΔW in the iron loss $W_{17/50}$ of each of the resulting grain-oriented electrical steel sheets in the longitudinal direction of the coil was 0.04 W/kg or less. That is, it was found that uniform magnetic properties were achieved throughout the length of the coil.

It is believed that a reduction in the number of the oxide inclusions (each having a diameter of 1 to 3 μm) containing Ca and/or Mg reduces regions deficient in precipitates of impurities and improves the uniformity in the distribution of the precipitates to suppress a variation in magnetic properties in response to a variation in heat history or the like in the coil. The cause of the variation in heat history in the coil is that, for example, the outer portion is rapidly heated and cooled compared with the inner portion, etc.

It is believed that the compositions of precipitates of the impurities are substantially identical to those of the precipitates complexly precipitated on the inclusions when the oxide inclusions each containing Ca and/or Mg are present in the vicinity of the precipitates of the impurities. Specifically, it is believed that the precipitate contains a sulfide as a main component, and an oxide, a nitride, and the like are present alone or in combination.

Accordingly, in the present invention, the number of the oxide particles each containing Ca and/or Mg and each having a diameter of 1 to 3 μm per unit area (1 cm$^2$) in the transverse cross-section perpendicular to the rolling direction is limited to 400 or less among the inclusions that steel sheet contains.

The number of the particles per unit area (1 cm$^2$) is more preferably 150 or less. In this case, the effect is more significant, and the variation is further reduced by about 30%. In order that the number of the particles per unit area (1 cm$^2$) is 150 or less, a measure for reducing the number of oxide particles may be enhanced. For example, it is effective that the waiting time before casting is set to 45 minutes or more.

In the example described above, the distribution of the inclusions was observed in the hot-rolled sheet. The oxide particles each containing Ca and/or Mg and each having a diameter of 1 to 3 μm are not easily deformed or fractured. Even when impurities containing the inclusions as nuclei are precipitated, the influence on dimensions can be substantially negligible because of small amounts of the impurities. Thus, the distribution and dimensions of the inclusions are little changed from after casting to a product sheet; hence, the inclusions may be verified at any point. Relatively less onerous measurement points are points after completion of hot rolling, after completion of hot rolled steel annealing, and after completion of a steel sheet product.

Examples of the oxides each containing Ca and/or Mg include CaO, MgO, composite oxides of both, and composite oxides of alumina and these compounds. Furthermore, small amounts of precipitates of impurities are observed in some measurement points in the course of the process, as shown in FIG. 2(b). A substance in which a peak assigned to Ca or Mg is observed with EDX is defined as an oxide containing Ca and/or Mg. The content of at least one of Ca and Mg may be about 0.1 mass % or more as a rough indication.

By applying the findings described above, the number of oxide particles each containing Ca and/or Mg may be controlled to 5,000 or more to reduce the variation in iron loss. This may be attributed to the fact that most of problematic inevitable impurities are complexly precipitated on the oxide particles (inclusions) to uniformize the matrix. However, this method increases the total number of the inclusions to significantly degrade the absolute value of iron loss. Thus, to uniformize the matrix, a method for reducing the number of the oxide particles is preferred.

Steel Composition

In the present invention, the cause of the limitation of the composition of the steel sheet to the range will be described below. The term "%" regarding the component means mass % unless otherwise specified.

Si: 2.0% or More and 4.5% or Less

Si is a useful element for improving iron loss due to an increase in electrical resistance. At a Si content of less than 2.0 mass %, the effect of sufficiently reducing iron loss is not achieved. At a Si content exceeding 4.5%, it is significantly difficult to perform cold rolling. Therefore, the Si content is limited in the range of 2.0% or more and 4.5% or less.

Mn: 0.01% or More and 0.5% or Less

Mn is a useful element for improving hot processability. At a Mn content of less than 0.01%, the effect of incorporation of Mn is poor. At a Mn content exceeding 0.5%, a primary recrystallization texture is degraded, thereby not easily forming secondary recrystallization grains highly oriented in the Goss orientation. Therefore, the Mn content is limited in the range of 0.01% or more and 0.5% or less.

The present invention provides a grain-oriented electrical steel sheet produced by a method for promoting secondary recrystallization-without an inhibitor. Thus, the inhibitor-forming elements such as Al, S, Se, and B are preferably minimized. Particularly preferred ranges (each on a mass basis) of components of a steel slab are described as follows: Al: less than 100 ppm, S and Se: 50 ppm or less each, and B: less than 5 ppm.

Excessive amounts of Al, S, Se, and B make secondary recrystallization difficult. This is because AlN, MnS, MnSe, BN, and the like coarsened by heating a slab result in a nonuniform primary recrystallization microstructure. Therefore, preferably, the Al content is suppressed to less than 100 ppm, the contents of S and Se are each suppressed to 50 ppm or less, and the B content is suppressed to less than 5 ppm so as not to act as inhibitors. More preferably, the Al content is 50 ppm or less, the S content is 30 ppm or less, and the Se content is 30 ppm or less. These may be zero percent.

After finishing annealing, S, Se, and B are decreased in a steel sheet. In the case where a steel sheet including a forsterite film usually formed when a magnesia-based annealing separator is applied is analyzed, a product sheet contains 30 ppm or less S (due to S in the steel sheet), 30 ppm or less Se, and 2 ppm or less B. Furthermore, the Al content is reduced to 50 ppm or less. Residual contents of S and B in base steel are 20 ppm or less and 1 ppm or less, respectively.

With respect to N, in order to inhibit the function as an inhibitor and prevent the formation of a silicon nitride after refining annealing, the N content of a steel slab is preferably 50 ppm or less. O is sometimes regarded as an inhibitor-forming element. When the O content exceeds 50 ppm, it is difficult to perform secondary recrystallization because of coarse oxide particles. Thus, the O content of the steel stab is preferably 50 ppm or less. These may be zero percent. The N content of a product sheet is also 50 ppm or less. Furthermore, each of the contents of N and O of base steel in the product sheet is 20 ppm or less.

A steel slab may optionally contain 0.01% to 0.10% by mass C. After decarburization annealing, a product sheet contains 50 ppm or less C. Alternatively, the produce sheet may contain zero percent C. Thus, it is possible to suppress an increase in crystal grain size until hot rolling and not to suppress grain growth in finishing annealing.

The essential components and suppressed components have been described. A steel sheet according to the present invention, if necessary, may further contain one or two or more of elements described below.

Ni: 0.005% to 1.50%

Ni has the effect of enhancing the uniformity of the microstructure of a hot-rolled sheet to improve magnetic properties. However, at a Ni content of less than 0.005%, the addition effect is poor. At a Ni content exceeding 1.50%, secondary recrystallization is unstably performed to degrade magnetic properties. Therefore, Ni is preferably contained in the range of 0.005% to 1.50%.

One or Two or More of 0.01% to 0.50% Sn, 0.005% to 0.50% Sb, 0.01% to 0.50% Cu, 0.01% to 0.50% Mo, 0.0050% to 0.50% P, and 0.01% to 1.50% Cr These elements contribute effectively to improvement of iron loss. However, when each of the contents is less than the corresponding lower limit, the addition effect is poor. When each of the contents exceeds the corresponding upper limit, the development of secondary recrystallization grains is suppressed. Thus, the elements are preferably contained in the ranges above. In particular, Sn, Sb, and Cu are elements that are sometimes regarded as auxiliary inhibitors. Thus, the contents of Sn, Sb, and Cu of the upper limits or more thereof are not preferred.

The remainder preferably contains iron and impurities, in particular, inevitable impurities, other than elements described above.

Production Process

A process according to the present invention for producing a grain-oriented electrical steel sheet will be described below.

As described above, the method for promoting secondary recrystallization without an inhibitor is a method including reducing an inhibitor-forming element and other impurity elements (purification) and reducing the suppression of grain boundary migration in secondary recrystallization annealing to further develop grains of the Goss orientation by difference in the rate of grain boundary migration.

Specifically, the method is a process for producing a grain-oriented electrical steel sheet, the process including, with respect to the composition of a slab, reducing the content of Al to less than 100 ppm, reducing the content of each of S, Se, O, and N to 50 ppm or less, and preferably reducing the B content to less than 5 ppm, which are inhibitor forming components; and hot-rolling the slab at a low-temperature (1,300° C. or less) or casting directly into a thin slab to form a hot-rolled sheet, followed by cold rolling, primary recrystallization annealing, and secondary recrystallization annealing.

Steps and conditions other than those specified below may be in accordance with Japanese Unexamined Patent Application Publication No. 2000-129356 and the like described above. Furthermore, the known production process with an inhibitor may serve as a reference within a range in which a technical idea is similar (for example, an overcoat insulating film, an annealing separator, and the like).

Molten steel adjusted to have the above-described preferred composition is prepared by refining according to a known method with a converter or an electric furnace and if necessary, to vacuum treatment (vacuum refining) or the like (completion of refining). Then, a steel slab is produced by an ingot-making process or a continuous casting process. Alternatively, thin cast slab having a thickness of 100 mm or less may be directly produced by direct casting.

In producing the steel slab according to the present invention, the content of oxides each containing Ca and/or Mg is minimized with reference to a known method for reducing inclusions.

For an increase in oxide content due to slag mixing, a reduction in the amount of the mixing is certainly effective. In addition, promoting the separation of the mixed slag by floating is also effective. For example, providing 30 minutes or more and preferably 45 minutes or more of waiting time before casting is effective. Furthermore, the inclusions may be increased in size by strong stirring or stirring for a prolonged period of time in a refining step, in particular, in a vacuum refining step to facilitate floating thereof. Moreover, a prolonged reflux time after deoxidization should result in the same effect Prevention of reoxidation from the slag is also effective. For example, a slag covering molten steel tapped from a converter, an electric furnace, or the like effectively has a basicity of 0.8 or more, and T/D flux effectively has a basicity of 1.0 or more and preferably 5 or more. Furthermore, a tundish may be shielded from air.

The slag is mainly composed of an oxide containing Si and either Ca or Mg. The basicity of the slag is calculated with the formula $CaO/SiO_2$ (mass ratio). The T/D flux usually contains CaO and $SiO_2$. In some cases, the T/D flux further contains at least one of $Al_2O_3$, FeO, and the like. The basicity may be similarly calculated with $CaO/SiO_2$.

The resulting steel slab is heated and then hot-rolled by a usual method. Alternatively, the steel slab may be directly hot-rolled after casting without the heating step. In the case of a thin cast slab, hot rolling may be performed. Alternatively, hot rolling may be omitted, and then the subsequent steps may be directly performed.

The heating temperature of the slab before hot rolling is particularly preferably 1,250° C. or lower in view of a reduction in the amount of scales formed during hot rolling. Furthermore, a lower heating temperature of the slab is preferred in order to reduce in the size of the crystalline microstructure and to make contaminated inhibitor-forming elements harmless. The preferred lower limit of the heating temperature of the slab is 1,050° C.

To improve the Goss texture (texture oriented in the Goss orientation) in a product sheet, a hot-rolled sheet after hot rolling is optionally subjected to hot rolled steel annealing (usually, by box annealing of a coil). In the case, in order to highly develop the Goss texture in the product sheet, the hot rolled steel annealing temperature is preferably about 800° C. to about 1,100° C. A hot rolled steel annealing temperature of less than 800° C. results in an insufficient effect of eliminating a band structure. At a hot rolled steel annealing temperature of higher than 1,100° C., contaminated inhibitor-forming elements adversely affect the sheet to increase the grain size after hot rolled steel annealing. In any of these cases, an intended effect of improving the Goss texture is not easily expressed.

After hot rolled steel annealing described above, cold rolling is performed once, or twice or more times including intermediate annealing, to form a sheet having a final thickness, followed by primary recrystallization annealing. In addition, the C content of steel is preferably reduced to 50 ppm or less, at which magnetic aging is not exhibited, and more preferably 30 ppm or less by decarburization annealing independently or also serving as primary recrystallization annealing.

With respect to cold rolling, performing cold rolling at a rolling temperature of 100° C. to 300° C., and performing aging treatment once or more in the range of 100° C. to 300° C. in the course of cold rolling, are effective in developing the Goss texture.

Primary recrystallization annealing is preferably performed in the range of 700° C. to 1,000° C. in a wet atmosphere because the primary recrystallization annealing also serves as decarburization treatment. In addition, after primary recrystallization annealing, a technique for increasing the Si content by siliconizing may be employed.

Subsequently, an annealing separator is applied to surfaces of the steel sheet. The resulting sheet is wound into a coil and is subjected to finishing annealing to develop secondary recrystallization texture and if necessary, to form a forsterite film. Furthermore, an insulating film may be formed thereon. Annealing for secondary recrystallization is preferably performed at 800° C. to 900° C. As described above, heat treatment may be continuously added in order to form a film or the like (the whole of the treatment is referred to as "finishing annealing"). Heat treatment for forming a film may be separately performed.

Any of known annealing separators, such as magnesia-based separators, alumina-silica-based separators, or the like, may be used. The type of insulating film is not particularly limited. Any of known insulating films, such as phosphate-based films, boric acid compound films, or the like, may be used.

In view of economics, the steel sheet of the present invention is preferably subjected to finishing annealing in the form of a coil having a weight of 5 ton or more and more preferably 10 ton or more because of a small variation in magnetic properties in the coil.

EXAMPLES

Compositions described in the following examples are expressed on a mass basis unless otherwise specified.

The present invention is not limited to examples described below. For example, in the following examples, inclusions are controlled by changing waiting time before casting. However, the present invention is not limited such control means. Furthermore, it is not necessary to control the waiting time within a specific range.

Example 1

When molten steel was tapped from a converter, CaO was added thereto to adjust slag basicity to 0.4 to 1.2. After degassing, contents of inhibitor-forming elements were sufficiently reduced and the composition was set to: 0.07% C, 3.5% Si, 0.07% Mn, 30 ppm sol. Al, 25 ppm N, 10 ppm S, 0.1 ppm Se, 10 ppm O, 0.02% Sb, 0.02% Sn, and 0.15% Cu. The remainder was composed of Fe and inevitable impurities. After the resulting molten steel having such a composition held for 20 to 45 minutes before continuous casting, casting was performed with three types of T/D flux having low basicity (about 0.8), high basicity (about 1.0 and about 1.5) to form steel slabs. The resulting steel slabs were heated to 1,150° C. and subjected to hot rolling to form hot-rolled sheet each having a thickness of 2.0 mm.

To check cleanliness of each hot-rolled sheet, a steel piece was cut from the middle portion of the coil in the width direction. The transverse cross-section of each piece perpendicular to the rolling direction was observed with a SEM equipped with EDX in a field of view of 1 cm$^2$. Dimensions, components, and types of inclusions observed in the entire field of view were investigated. The total number of the inclusions was measured. The number of oxide particles each having a diameter of 1 to 3 μm and each containing Ca and/or Mg was measured. Measurement of particle sizes of the inclusions was made in the same way as in FIG. 1, except that measurement was not made for inclusions each having a diameter of less than 1 μm.

Then, after performing hot rolled steel annealing at 1,000° C. for 30 seconds, cold rolling was performed to form cold-rolled sheets each having a thickness of 0.30 mm. Primary recrystallization annealing (also serving as decarburization annealing) was then performed at a soaking temperature of 850° C. for 70 seconds. A water slurry of an annealing separator containing 95% MgO and 5% TiO$_2$ (mass ratio) was then applied to the steel sheets. Finishing annealing was then performed under the following conditions: heat treatment (secondary recrystallization treatment) at 800° C. to 900° C. for 50 hours and then heat treatment at 1150° C. for 5 hours. A coating solution containing aluminum phosphate, colloidal silica, and chromic anhydride (about 5:4:1 (mass ratio)) was applied thereon and baked at 800° C. to form insulating films.

Iron loss ($W_{17/50}$, i.e., iron loss when excited at 50 Hz and 1.7 T) was continuously measured throughout the length of the resulting coils (each having a weight of 5 to 15 ton) with a continuous iron loss measurement apparatus. Evaluation was performed by means of the difference ΔW between the maximum and minimum values of the iron loss.

Table 1 shows the results.

TABLE 1

| No. | Waiting time (min) | Slag basicity | T/D flux basicity | Number of oxide particle containing Ca and/or Mg (number/cm$^2$) | Total number of inclusion (number/cm$^2$) | ΔW$_{17/50}$ (W/kg) | Remarks |
|---|---|---|---|---|---|---|---|
| 1 | 33 | 1.0 | 1.5 | 334 | 725 | 0.058 | Inventive example 1 |
| 2 | 45 | 1.2 | 1.0 | 122 | 212 | 0.008 | Inventive example 2 |
| 3 | 40 | 0.9 | 1.4 | 105 | 264 | 0.004 | Inventive example 3 |
| 4 | 25 | 0.8 | 0.8 | 461 | 576 | 0.148 | Comparative example 1 |
| 5 | 30 | 0.4 | 1.0 | 698 | 873 | 0.283 | Comparative example 2 |
| 6 | 20 | 0.5 | 0.7 | 953 | 1722 | 0.411 | Comparative example 3 |

The observation results of the inclusions in the hot-rolled sheets demonstrated as follows: The oxides was mainly composed of Al-based oxide formed during Al deoxidization. As is apparent from Table 1, ΔW was small when the number of oxide particles each containing Ca and/or Mg and each having a diameter of 1 to 3 μm was 400 or less, regardless of the total number of the inclusions. In particular, when the number of oxide particles each containing Ca and/or Mg and each having a diameter of 1 to 3 μm was 150 or less, the effect was significant.

Example 2

When molten steel was tapped from a converter, CaO was added thereto to adjust slag basicity to 1.0±0.1. After degassing the molten steel, contents of inhibitor-forming elements were sufficiently reduced and the composition was set to: 0.03% C, 3.2% Si, 0.10% Mn, 5 ppm sol. Al, 40 ppm N, 20 ppm S, 20 ppm O, 0.04% Sb, and 0.05% Cu. The remainder was composed of Fe and inevitable impurities. After the resulting molten steel having such a composition held for 10 to 50 minutes before continuous casting, casting was performed with T/D flux having high basicity (>1.5) to form steel slabs. The resulting steel slabs were heated to 1,180° C. and subjected to hot rolling to form hot-rolled sheet each having a thickness of 1.8 mm. Then, after performing hot rolled steel annealing at 1,050° C. for 30 seconds, cold rolling was performed to form cold-rolled sheets each having a thickness of 0.30 mm. Primary recrystallization annealing (also serving as decarburization annealing) was then performed at a soaking temperature of 850° C. for 70 seconds. A water slurry of an annealing separator containing 95% MgO and 5% SrSO$_4$ was then applied to the steel sheets. Finishing annealing was then performed at 800° C. to 900° C. for 50 hours and then at 1150° C. for 5 hours. A phosphate-chromate-colloidal silica (3:1:2 (mass ratio)) coating solution was applied thereon and baked at 800° C. to form insulating films.

To check cleanliness of each steel sheet, a steel piece was cut from the middle portion in the width direction of an end (in the longitudinal direction) of the coil. After removing the films by pickling, the transverse cross-section of each piece perpendicular to the rolling direction was observed in a field of view of 1 cm² (total area of a combination of the pieces) in the same way as in EXAMPLE 1. Dimensions, components, and types of inclusions observed in the entire field of view were investigated. The total number of the inclusions was measured. The number of oxide particles each having a diameter of 1 to 3 μm and each containing Ca and/or Mg was measured.

Iron loss $W_{17/50}$ was continuously measured throughout the length of the resulting coils (each having a weight of 8 to 9 ton). Evaluation was performed by means of the difference ΔW between the maximum and minimum values of the iron loss.

Table 2 shows the results.

the molten steel, contents of inhibitor-forming elements and the like were sufficiently reduced to the following levels: 60 ppm sol. Al, 26 ppm N, 18 ppm S, 2 ppm Se, 20 ppm O, 0.01% Sb, 0.01% Sn, and 0.1% Cu. The remainder was composed of components shown in Table 3, Fe, and inevitable impurities. After the resulting molten steel having such a composition held for 25 to 48 minutes before continuous casting, casting was performed with T/D flux having a high basicity (5 or more) to form steel slabs. The resulting steel slabs were heated to 1,100° C. to 1,150° C. and subjected to hot rolling to form hot-rolled sheet each having a thickness of 1.8 mm. Then, after performing hot rolled steel annealing at 1,000° C. for 20 seconds, cold rolling was performed to form cold-rolled sheets each having a thickness of 0.30 mm. Primary recrystallization annealing (also serving as decarburization annealing) was then performed at a soaking temperature of 800° C. to 820° C. for 60 seconds. A water slurry of an annealing separator containing 95% MgO and 5% TiO was then applied to the steel sheets. Finishing annealing was performed at 800° C. to 900° C. for 10 hours and then at 1,000° C. to 1,100° C. for 20 hours. A phosphate-chromate-colloidal

TABLE 2

| No. | Waiting time (min) | Number of oxide particle containing Ca and/or Mg (number/cm²) | Total number of inclusion (number/cm²) | $\Delta W_{17/50}$ (W/kg) | Remarks |
|---|---|---|---|---|---|
| 1 | 43 | 356 | 1500 | 0.062 | Inventive example 1 |
| 2 | 50 | 115 | 413 | 0.003 | Inventive example 2 |
| 3 | 35 | 230 | 287 | 0.022 | Inventive example 3 |
| 4 | 20 | 514 | 757 | 0.245 | Comparative example 1 |
| 5 | 10 | 1141 | 1225 | 0.311 | Comparative example 2 |

The observation results of the inclusions in the product sheets demonstrated as follows: Oxides mainly containing Si were often observed. As shown in Table 2, ΔW was small when the number of oxide particles each containing Ca and/or Mg and each having a diameter of 1 to 3 μm was 400 or less, regardless of the total number of the inclusions. In particular, when the number of oxide particles each containing Ca and/or Mg and each having a diameter of 1 to 3 μm was 150 or less, the effect was significant.

Example 3

When molten steel was tapped from a converter, CaO was added thereto to adjust slag basicity to 1.2. After degassing silica (3:1:2 (mass ratio)) coating solution was applied thereon and baked at 800° C. to form insulating films.

Cleanliness of the resulting steel sheets were investigated in the same way as in EXAMPLE 1. The total number of the inclusions was 1,000/cm² or less. Iron loss $W_{17/50}$ was continuously measured throughout the length of the resulting coils (each having a weight of about 7 ton). Mean values were calculated. Evaluation was performed by means of the difference ΔW between the maximum and minimum values of the iron loss. In some samples, six pieces were cut from the coil at intervals of 500 m. Magnetic flux density BB (value at a magnetizing force of 800 A/m) was also measured.

Table 3 shows the results.

TABLE 3

| No. | Waiting time (min) | Composition (mass %) | | | | Number of oxide particle containing Ca and/or Mg (number/cm²) | Mean $W_{17/50}$ (W/kg) | $\Delta W_{17/50}$ (W/kg) | ΔW/W* |
|---|---|---|---|---|---|---|---|---|---|
| | | C | Si | Mn | Other | | | | |
| 1 | 25 | | | | | 703 | 1.068 | 0.126 | 0.118 |
| | 35 | 0.03 | 3.3 | 0.10 | Ni: 0.01 | 396 | 1.038 | 0.049 | 0.047 |
| | 48 | | | | | 128 | 1.041 | 0.011 | 0.011 |
| 2 | 25 | | | | | 922 | 1.153 | 0.337 | 0.292 |
| | 35 | 0.06 | 3.0 | 0.05 | P: 0.10 | 260 | 1.134 | 0.042 | 0.037 |
| | 48 | | | | | 141 | 1.133 | 0.011 | 0.010 |
| 3 | 25 | | | | | 528 | 0.983 | 0.141 | 0.143 |
| | 35 | 0.05 | 3.5 | 0.20 | — | 305 | 0.990 | 0.064 | 0.065 |
| | 48 | | | | | 97 | 0.979 | 0.005 | 0.005 |
| 4 | 25 | | | | | 702 | 1.146 | 0.151 | 0.132 |
| | 35 | 0.02 | 2.8 | 0.02 | — | 201 | 1.129 | 0.031 | 0.027 |
| | 48 | | | | | 137 | 1.139 | 0.008 | 0.007 |
| | 25 | | | | | 650 | 0.965 | 0.097 | 0.101 |

TABLE 3-continued

| No. | Waiting time (min) | Composition (mass %) | | | | Number of oxide particle containing Ca and/or Mg (number/cm$^2$) | Mean $W_{17/50}$ (W/kg) | $\Delta W_{17/50}$ (W/kg) | $\Delta W/W^*$ |
|---|---|---|---|---|---|---|---|---|---|
| | | C | Si | Mn | Other | | | | |
| 5 | 35 | 0.05 | 4.0 | 0.35 | — | 274 | 0.954 | 0.050 | 0.052 |
| | 48 | | | | | 82 | 0.951 | 0.012 | 0.013 |

*$\Delta W_{17/50}$/Mean $W_{17/50}$

As is apparent from Table 3, when the number of the oxide particles each containing Ca and/or Mg and having a diameter of 1 to 3 μm was 400 or less, ΔW was 0.07 W/kg or less, regardless of the level of iron loss. That is, variation was found to be small. Thus, in any of these types of steel, a portion outside a grade (set in increments of about 0.1 W/kg) in the coil can be significantly reduced, thereby markedly reducing load of coil splitting.

When the number of the oxide particles each containing Ca and/or Mg and having a diameter of 1 to 3 μm was 150 or less, ΔW was 0.02 W/kg or less. Thus, the effect was further significant.

Mean values of $B_8$ in No. 1 were 1.892 T in Comparative Example, 1.889 T when the number of inclusions each containing Ca and/or Mg was 400 or less, and 1.894 T when the number of inclusions each containing Ca and/or Mg was 150 or less. Ranges of variations in $\Delta B_8$ were 0.022 T in Comparative Example, 0.011 T when the number of the inclusions each containing Ca and/or Mg was 400 or less, and 0.005 T when the number of the inclusions each containing Ca and/or Mg was 150 or less. That is, the effect of reducing the non-uniformity in magnetic flux density was also shown in the present invention.

Industrial Applicability

According to the present invention, in a grain-oriented electrical steel sheet capable of being produced by a method for promoting secondary recrystallization without an inhibitor at low costs, controlling the precipitate state of specific oxides contained in the steel sheet results in excellent stable magnetic properties throughout the length of a coil.

The invention claimed is:

1. A grain-oriented electrical steel sheet produced by a method for promoting secondary recrystallization without an inhibitor, the grain-oriented electrical steel sheet comprising:
    2.0% or more and 4.5% or less of Si and 0.01% or more and 0.5% or less of Mn on a mass % basis,
    wherein the steel sheet contains oxide particles containing Ca and/or Mg and the number of oxide particles having a diameter of 1 to 3 μm and containing Ca and/or Mg is 400 or less per cm$^2$ in a transverse cross-section perpendicular to a rolling direction.

2. The grain-oriented electrical steel sheet according to claim 1, wherein the number of the oxide particles having a diameter of 1 to 3 μm and containing Ca and/or Mg is 150 or less per cm$^2$ in the transverse cross-section perpendicular to the rolling direction.

3. The grain-oriented electrical steel sheet according to claim 1, further comprising at least one of the following:
    0.005% to 1.50% Ni, 0.01% to 0.50% Sn,
    0.005% to 0.50% Sb, 0.01% to 0.50% Cu,
    0.01% to 0.50% Mo, 0.0050% to 0.50% P, and
    0.01% to 1.50% Cr, on a mass % basis.

4. The grain-oriented electrical steel sheet according to claim 2, further comprising at least one of the following:
    0.005% to 1.50% Ni, 0.01% to 0.50% Sn,
    0.005% to 0.50% Sb, 0.01% to 0.50% Cu,
    0.01% to 0.50% Mo, 0.0050% to 0.50% P, and
    0.01% to 1.50% Cr, on a mass % basis.

5. A grain-oriented electrical steel sheet having a forsterite film, comprising:
    2.0% or more and 4.5% or less of Si and 0.01% or more and 0.5% or less of Mn on a mass % basis,
    wherein the contents of the steel sheet including the forsterite film are suppressed as follows: 50 ppm or less Al, 30 ppm or less Se, 50 ppm or less N, and 2 ppm or less B, Al, Se, N, and B being impurities, and a content of O in a base steel is suppressed to 20 ppm or less, and
    the number of oxide particles having a diameter of 1 to 3 μm and containing Ca and/or Mg is 400 or less per cm$^2$ in a transverse cross-section perpendicular to a rolling direction.

6. The grain-oriented electrical steel sheet according to claim 5, wherein the number of the oxide particles having a diameter of 1 to 3 μm and containing Ca and/or Mg is 150 or less per cm$^2$ in the transverse cross-section perpendicular to the rolling direction.

7. The grain-oriented electrical steel sheet according to claim 6, further comprising at least one of the following:
    0.005% to 1.50% Ni, 0.01% to 0.50% Sn,
    0.005% to 0.50% Sb, 0.01% to 0.50% Cu,
    0.01% to 0.50% Mo, 0.0050% to 0.50% P, and
    0.01% to 1.50% Cr, on a mass % basis.

8. The grain-oriented electrical steel sheet according to claim 5, further comprising at least one of the following:
    0.005% to 1.50% Ni, 0.01% to 0.50% Sn,
    0.005% to 0.50% Sb, 0.01% to 0.50% Cu,
    0.01% to 0.50% Mo, 0.0050% to 0.50% P, and
    0.01% to 1.50% Cr, on a mass % basis.

9. A grain-oriented electrical steel sheet produced by a method for promoting secondary recrystallization without an inhibitor, the grain-oriented electrical steel sheet comprising 2.0% or more and 4.5% or less of Si and 0.01% or more and 0.5% or less of Mn, on a mass % basis, wherein the number of oxide particles having a diameter of 1 to 3 μm and containing Ca and/or Mg is 82 to 400 per cm$^2$ in a transverse cross-section perpendicular to a rolling direction.

10. A process for producing the grain-oriented electrical steel sheet claim 1, comprising:
    hot-rolling a steel slab to form a hot-rolled steel sheet, the steel slab containing 2.0% or more and 4.5% or less of Si, 0.01% or more and 0.5% or less of Mn, and suppressed elements of less than 100 ppm Al, 50 ppm or less S, 50 ppm or less Se, 50 ppm or less O, and 50 ppm or less N, on a mass % basis;
    cold-rolling the hot-rolled steel sheet to form a cold-rolled steel sheet; and subjecting the cold-rolled steel sheet to primary recrystallization annealing and secondary recrystallization annealing, wherein the number of oxide particles having a diameter of 1 to 3 μm and containing Ca and/or Mg in the hot-rolled steel sheet is controlled to 400 or less per $cm^2$ in a transverse cross-section perpendicular to a rolling direction.

11. The process for producing a grain-oriented electrical steel sheet according to claim 10, wherein the steel slab further has a restrained content of B of less than 5 ppm.

12. The process according to claim 11, wherein the number of the oxide particles having a diameter of 1 to 3 μm and containing Ca and/or Mg in the hot-rolled steel sheet is 150 or less per $cm^2$ in the transverse cross-section perpendicular to the rolling direction.

13. The process according to claim 10, wherein the number of the oxide particles having a diameter of 1 to 3 μm and containing Ca and/or Mg in the hot-rolled steel sheet is 150 or less per $cm^2$ in the transverse cross-section perpendicular to the rolling direction.

* * * * *